(12) United States Patent
Joshi et al.

(10) Patent No.: US 12,092,334 B2
(45) Date of Patent: Sep. 17, 2024

(54) INTEGRATED FUEL CELL AND ENGINE COMBUSTOR ASSEMBLY

(71) Applicant: General Electric Company, Schenectady, NY (US)

(72) Inventors: Narendra D. Joshi, Schenectady, NY (US); Hendrik Pieter Jacobus de Bock, Clifton Park, NY (US); Richard L. Hart, Broadalbin, NY (US); Anil R. Duggal, Niskayuna, NY (US); Seung-Hyuck Hong, Clifton Park, NY (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 17/307,784

(22) Filed: May 4, 2021

(65) Prior Publication Data

US 2022/0356848 A1    Nov. 10, 2022

(51) Int. Cl.
| | |
|---|---|
| F23R 3/40 | (2006.01) |
| F02C 3/20 | (2006.01) |
| H01M 8/04746 | (2016.01) |
| F02C 7/224 | (2006.01) |

(52) U.S. Cl.
CPC .................. F23R 3/40 (2013.01); F02C 3/20 (2013.01); H01M 8/04761 (2013.01); *F02C 7/224* (2013.01); *F05D 2260/213* (2013.01); *F05D 2260/232* (2013.01)

(58) Field of Classification Search
CPC .................................. F23R 3/286; F23R 3/14
See application file for complete search history.

(56) References Cited

U.S. PATENT DOCUMENTS

| | | | |
|---|---|---|---|
| 5,366,819 | A | 11/1994 | Hartvigsen et al. |
| 5,541,014 | A | 7/1996 | Micheli et al. |
| 5,573,867 | A | 11/1996 | Zafred et al. |
| 7,118,818 | B2 | 10/2006 | Agnew et al. |
| 7,966,830 | B2 | 6/2011 | Daggett |
| 8,882,865 | B2 | 11/2014 | Johnston |

(Continued)

FOREIGN PATENT DOCUMENTS

| | | |
|---|---|---|
| CN | 102460797 A | 5/2012 |
| EP | 0967676 A1 | 12/1999 |

(Continued)

*Primary Examiner* — Gerald L Sung
*Assistant Examiner* — Alyson Joan Harrington
(74) *Attorney, Agent, or Firm* — Venable LLP; Peter T. Hrubiec; Michele V. Frank

(57) ABSTRACT

An engine assembly includes a combustor, a fuel cell stack integrated with the combustor, the fuel cell stack configured (i) to direct fuel and air exhaust from the fuel cell stack into the combustor and (ii) to generate electrical energy, a catalytic partial oxidation convertor that is fluidly connected to the fuel cell stack, the catalytic partial oxidation convertor being configured to optimize a hydrogen content of a fuel stream to be directed into the fuel cell stack, and one or more subsystems electrically connected with the fuel cell stack, the one or more subsystems being configured to receive the electrical energy generated by the fuel cell stack. The combustor is configured to combust the fuel and air exhaust from the fuel cell stack into one or more gaseous combustion products that drive a downstream turbine.

20 Claims, 4 Drawing Sheets

(56) References Cited

U.S. PATENT DOCUMENTS

| | | | |
|---|---|---|---|
| 2006/0127720 A1* | 6/2006 | Ferrall | H01M 8/0662 |
| | | | 429/442 |
| 2013/0145765 A1* | 6/2013 | Patel | F23R 3/286 |
| | | | 60/737 |
| 2014/0047814 A1* | 2/2014 | Steinwandel | H01M 8/04111 |
| | | | 60/39.12 |
| 2014/0255733 A1 | 9/2014 | Masset et al. | |
| 2019/0136761 A1 | 5/2019 | Shapiro et al. | |
| 2020/0194799 A1 | 6/2020 | Hart et al. | |

FOREIGN PATENT DOCUMENTS

| | | |
|---|---|---|
| EP | 1659654 B1 | 4/2010 |
| WO | 2019160036 A1 | 8/2019 |

\* cited by examiner

INTEGRATED FUEL CELL AND ENGINE COMBUSTOR ASSEMBLY

TECHNICAL FIELD

The present subject matter generally relates to power generating systems, such as fuel cells and gas turbine engines. In particular, the present disclosure relates to a combination of a combustion system with an integrated fuel cell for a gas turbine engine. The present disclosure further relates to the inclusion of (i) a catalytic partial oxidation (C-POX) convertor for developing a hydrogen rich fuel stream and (ii) one or more subsystems powered by energy generated by the fuel cell and/or the catalytic partial oxidation (C-POX) convertor.

BACKGROUND

Fuel efficiency of engines can be an important consideration in the selection and operation of engines. For example, fuel efficiency of gas turbine engines in aircraft can be an important (and a limiting) factor on how far the aircraft can travel. Current aircraft jet engines generally provide mostly shaft (e.g., mechanical) power that is converted into propulsion using a fan mounted shaft and a small amount of power generation. Some aircraft propulsion systems can, however, include fuel cells in addition to the gas turbine engines. These fuel cells can be located upstream of combustors or surrounding the combustors and downstream from compressors of the gas turbine engines. Compressed air that is output by the compressors flows along the length of the engine and into the fuel cells. A portion of this air is consumed by the fuel cells in generating electrical energy. The rest of the air can flow through or around the fuel cells and into a combustor. This air is then mixed with fuel and combusted in a combustor of the engine.

BRIEF SUMMARY

An engine assembly comprising: (a) a combustor; (b) a fuel cell stack integrated with the combustor, the fuel cell stack configured (i) to direct fuel and air exhaust from the fuel cell stack into the combustor and (ii) to generate electrical energy; (c) a catalytic partial oxidation convertor that is fluidly connected to the fuel cell stack, the catalytic partial oxidation convertor being configured to optimize a hydrogen content of a fuel stream to be directed into the fuel cell stack; and (d) one or more subsystems electrically connected with the fuel cell stack, the one or more subsystems being configured to receive the electrical energy generated by the fuel cell stack, wherein the combustor is configured to combust the fuel and air exhaust from the fuel cell stack into one or more gaseous combustion products that drive a downstream turbine.

An engine assembly comprising: (a) a combustor; (b) a fuel cell stack integrated with the combustor, the fuel cell stack configured (i) to direct fuel and air exhaust from the fuel cell stack into the combustor and (ii) to generate electrical energy; (c) a catalytic partial oxidation convertor that is fluidly connected to the fuel cell stack, the catalytic partial oxidation convertor being configured to optimize a hydrogen content of a fuel stream to be directed into the fuel cell stack; (d) an AC/DC convertor configured to convert DC current of the electrical energy generated by the fuel cell stack into AC current; and (e) one or more subsystems electrically connected with the fuel cell stack, the one or more subsystems being configured to receive the AC current, wherein the combustor is configured to combust the fuel and air exhaust from the fuel cell stack into one or more gaseous combustion products that drive a downstream turbine.

A method comprising: (a) directing air from a compressor into fuel cells of a fuel cell stack integrated with a combustor of a turbine engine; (b) directing fuel into the fuel cells of the fuel cell stack; (c) converting at least some of the air and fuel that enters the fuel cells of the fuel cell stack into electrical energy; (d) converting the electrical energy into AC current for use by one or more engine systems; (e) radially directing fuel and air exhaust from the fuel cell stack into a combustor; (f) combusting the fuel and air exhaust into gaseous combustion products in the combustor; and (g) driving a turbine of a turbine engine using the gaseous combustion products.

Additional features, advantages, and embodiments of the disclosure are set forth or apparent from consideration of the following detailed description, drawings, and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Figure 1:
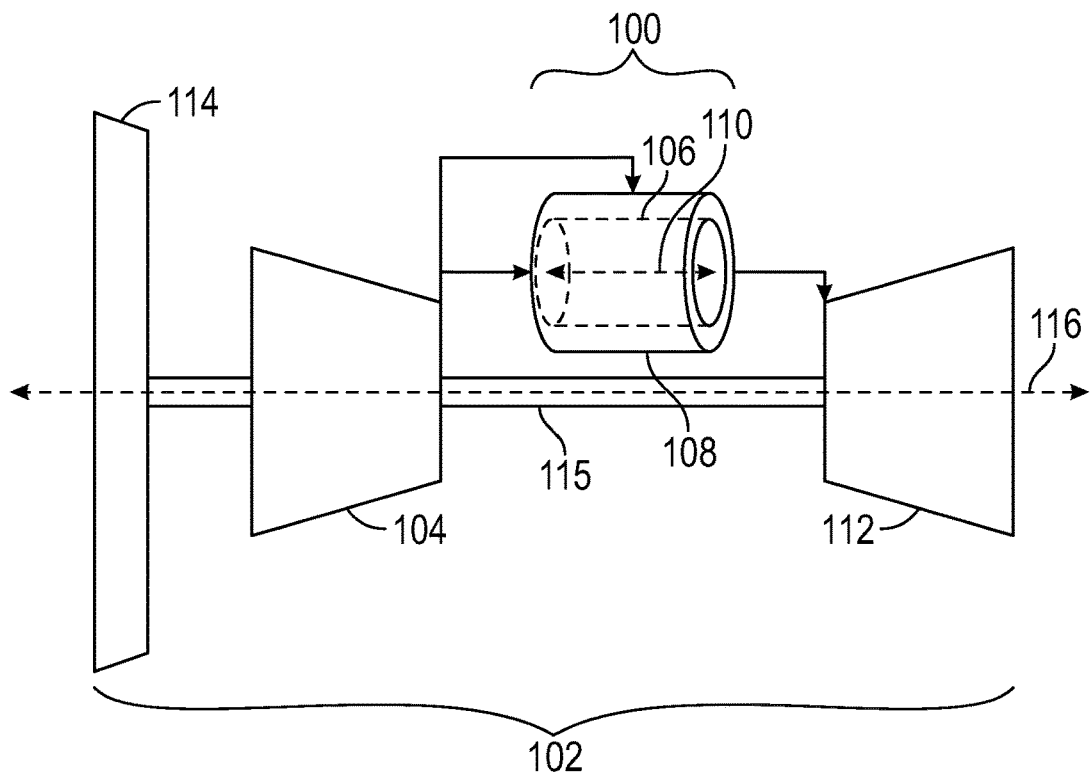
FIG. 1 illustrates a combination of a combustion system with an integrated fuel cell used in a gas turbine engine system, according to an embodiment of the present disclosure.

Various embodiments are discussed in detail below. While specific embodiments are discussed, this is done for illustration purposes only. A person skilled in the relevant art will recognize that other components and configurations may be used without departing from the spirit and scope of the present disclosure.

The present disclosure relates to a fuel cell and combustor combination system. One problem with known fuel cell and combustor combinations is the requirement of conduits to direct the flow of air into the fuel cells and out of the fuel cells into the combustor. These conduits can increase the size of the fuel cell and combustor combination for an engine. In addition, current aircraft jet engines generally provide mostly shaft (e.g., mechanical) power that is converted into propulsion using a fan mounted shaft and a small amount of power generation. Thus, for more efficient and reduced emissions for engines and/or flights, architectures and systems that provide direct current (DC) power generation on-board, such as, e.g., fuel cells, are needed to enable more electrical architecture, such as, e.g., a series of electrical motors that drive fans, boundary layer ingestion, etc. Thus, the present disclosure relates to a combination of a combustion system with an integrated fuel cell for a gas turbine engine. The present disclosure further relates to the inclusion of (i) a catalytic partial oxidation (C-POX) convertor for developing a hydrogen rich fuel stream (and/or optimizing a hydrogen content of a fuel stream to be directed into the fuel cell and/or fuel cell stack) and (ii) one or more subsystems powered by the energy generated by the fuel cell and/or the catalytic partial oxidation (C-POX) convertor. For example, gas turbine engines, such as those used with airplanes, generally provide mostly shaft (e.g., mechanical) power that is converted into propulsion using a fan mounted shaft and a small amount of power generation. By contrast, fuel cells generally provide electrical energy in the form of, e.g., a direct current (DC) that may be converted to alternating current (AC) via, for example, an inverter. The DC or AC voltage can be used to power motors, lights, communication equipment, and any number of electrical devices and systems. Thus, by incorporating fuel cell technology, such as solid oxide fuel cells (SOFCs), with the gas turbine engine, e.g., by integrating such fuel cell technology within the combustor of the gas turbine, electrical energy can be generated to drive various subsystems, including, e.g., fans for propulsion, generators, etc. Such fuel cell technology (e.g., SOFCs), however, usually requires the cell to operate at a certain temperature, such as, e.g., 600 to 800° C., to be efficient, and with a fuel stream rich in hydrogen and carbon monoxide. Thus, according to embodiments of this disclosure, a catalytic partial oxidation (C-POX) convertor is included for developing a hydrogen rich fuel stream for the solid oxide fuel cell (e.g., optimizing a hydrogen content of a fuel stream to be directed into the fuel cell and/or fuel cell stack).

In general, a solid oxide fuel cell consumes between 1% and 50% of the fuel energy in generating electricity. Traditional fuel cells keep the air and fuel sides of the fuel cell separate and recycle the fuel to maximize conversion of fuel in the fuel cycle. This requires a substantial balance of heat exchangers, pumps, and plumbing, all of which can be eliminated by the integrated combustor and fuel cell of the present disclosure. For example, according to embodiments of this disclosure, unburned fuel and air from the solid oxide fuel cell are dumped directly into the gas turbine combustor and consumed.

According to one embodiment of the present disclosure, a combination of a combustion system with an integrated fuel cell for a gas turbine engine is combined with a catalytic partial oxidation (C-POX) convertor for developing a hydrogen rich fuel stream for a solid oxide fuel cell that is designed into the outer and/or inner liners of the gas turbine combustor. In addition, one or more subsystems to be powered by the energy generated by the fuel cell and/or the catalytic partial oxidation (C-POX) convertor are included with the combined combustion system having the integrated fuel cell. In operation, a main/pilot burner, typically present in conventional gas turbine combustors, is used to start the gas turbine engine and to increase the operating temperature, pressure, and mass flow of air. Once the temperature, pressure, and mass air flow are sufficiently high, fuel is diverted to the catalytic partial oxidation convertor to facilitate the functioning of the solid oxide fuel cell located within the combustor liner region. A hydrogen and carbon monoxide stream, which is developed in the catalytic partial oxidation convertor, is utilized in the solid oxide fuel cell to generate electrical power. Unburned fuel and air from the solid oxide fuel cell is channeled into the combustor where a main/pilot flame is present and provides ignition to consume any unburned hydrogen and carbon monoxide effluents from the solid oxide fuel cell. The heated air is then channeled into the gas turbine nozzle for work extraction by the turbine.

According to one embodiment, hydrogen ($H_2$) fuel can be used as one of the fuel sources with the combustion system having the integrated fuel cell, as opposed to (or in addition to) a hydrocarbon fuel source. According to this embodiment, a catalytic partial oxidation (C-POX) convertor may not be necessary for this hydrogen ($H_2$) fuel source, and thus, the hydrogen ($H_2$) fuel stream can be directed into the fuel cell (e.g., SOFC) that is integrated into the outer and/or inner liners of the gas turbine combustor.

According to one embodiment, various fuel sources can be used with the proposed engine system, including the combustion system having the integrated fuel cell. Non-limiting examples of fuel sources for the engine system include, e.g., kerosene fuels, such as Jet A, JP-8, and JP-5 and synthetic analogues, bio-jet fuels, synthetic gasoline, biodiesel, methanol, dimethyl ether (DME), ethanol, glycerol, formic acid, ammonia, hydrazine hydrate, liquid hydrogen, compressed hydrogen, and combinations thereof.

According to one embodiment, a pre-burner system and/or a heat exchanger can also be included to increase the temperature of a portion of air coming from the compressor to a certain temperature (e.g., 600 to 800° C.) to further facilitate the functioning of the solid oxide fuel cell located within the combustor liner region. For example, once the temperature, pressure, and mass air flow are sufficiently high, a portion of fuel can be diverted to the pre-burner system to increase the temperature of the portion of air coming from the compressor. The air heated by the pre-burner system, along with the hydrogen and carbon monoxide stream described above, which is developed in the catalytic partial oxidation convertor, and/or the hydrogen ($H_2$) fuel stream, is utilized in the solid oxide fuel cell to generate electrical power in the form of, e.g., direct current (DC) power.

One or more embodiments described herein provide fuel cell and combustor assemblies for engine systems, such as, e.g., gas turbine engines of aircraft (or other vehicles or stationary power-generating systems). The assemblies (and accompanying methods described herein) integrate fuel cells (e.g., solid oxide fuel cells) and a combustor of an engine to provide electrical power and propulsion power in a thermally efficient manner. A fuel cell stack is arranged around the exterior of a combustor of the engine such that air flows radially inward through the fuel cells in the fuel cell stack, and into the combustor toward a center or an annular axis of the combustor. The fuel cell stack can be integrated into the outer and/or inner housing (i.e., liner) of the combustor such that no additional conduits or ducting is needed to fluidly couple the fuel cell stack with the combustor.

The fuel cell and combustor assemblies described herein can be used to generate electrical power for the creation of thrust in addition to that provided by engine exhaust. For example, the draw of electrical current from the fuel cell stack in a gas turbine engine can be used to power one or more motors that add torque to a fan of the gas turbine engine. This increases overall fuel efficiency of a propulsion system that includes the fuel cells and combustors. For example, there is potential for at least a 10% or more reduction in fuel burn to complete a flight via, e.g., an aircraft engine having the fuel cell and combustor assemblies described herein.

FIG. 1 illustrates one embodiment of a combination of a combustion system with an integrated fuel cell (i.e., a fuel cell and combustor assembly 100) used in a gas turbine engine 102. The gas turbine engine 102 includes a shaft 115 that mechanically connects at least one compressor 104 to a turbine 112. The at least one compressor 104 receives inlet air and compresses this air via one or more stages of rotating blades. The compressed air is directed into the fuel cell and combustor assembly 100.

The assembly 100 includes an annular combustor 106 that is circumferentially surrounded along some or all of the length of the combustor 106 by a fuel cell stack 108. The fuel cell stack 108 includes multiple fuel cells arranged to convert fuel and compressed air from the compressor 104 into electrical energy. The fuel cell stack 108 can be integrated into the outer portion of the combustor 106 such that the fuel cell stack 108 is part of the combustor 106 and is located radially outside of the combustor 106 (e.g., relative to an annular axis 110 of the combustor 106). The gas turbine engine 102 includes a center axis 116 within the shaft 115 that may be coincident with the annular axis 110 or may not be coincident with the annular axis 110.

Some of the compressed air exiting the compressor 104 is directed through the fuel cells in the fuel cell stack 108 in radially inward directions toward the annular axis 110 of the combustor 106. Some or all of the remaining amount of compressed air from the compressor 104 is directed into the combustor 106 in a direction or directions along or parallel to the annular axis 110 of the combustor 106.

The fuel cells in the fuel cell stack 108 receive fuel from fuel manifolds and air from the compressor 104, and convert this fuel and air into electrical energy. Partially oxidized fuel and air exhaust from the fuel cells in the fuel cell stack 108 flow radially inwardly into the combustor 106 toward the annular axis 110. The partially consumed fuel and air exhaust from the fuel cells, additional air from the compressor 104, and/or additional fuel from one or more fuel injectors (e.g., pilot and/or main injectors) are combusted within the combustor 106. Exhaust from the combusted fuel and air mixture is then directed into the turbine 112, which converts the exhaust into rotating energy via the shaft 115 that can be used to power one or more loads 114, such as a fan used to propel a vehicle (e.g., an aircraft), a generator, or the like. According to one embodiment, the shaft 115 is a single shaft that connects the load or fan 114 to the compressor 104 and the turbine 112. According to another embodiment, the shaft 115 comprises (i) an outer shaft that connects the compressor 104 to the turbine 112, and (ii) an inner shaft that connects the load or fan 114 to the turbine 112.

Figure 2:
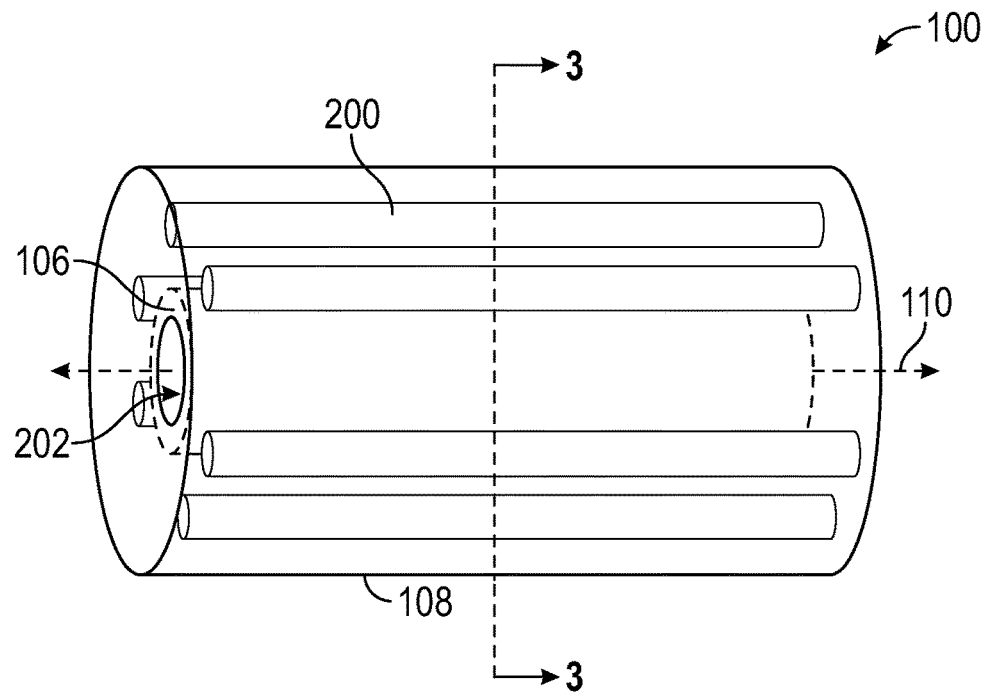
FIG. 2 illustrates the combustion system with an integrated fuel cell shown in FIG. 1 according to an embodiment of the present disclosure.

FIG. 2 schematically illustrates one embodiment of the combination of a combustion system with an integrated fuel cell (i.e., the fuel cell and combustor assembly 100 shown in FIG. 1). As described above, the assembly 100 includes the fuel cell stack 108 located radially outward of the combustor 106 relative to the annular axis 110 of the combustor 106. The fuel cell stack 108 includes several fuel manifolds 200 located at different portions along the perimeter of the combustor 106. The number and/or arrangement of the fuel manifolds 200 shown in FIG. 2 is one embodiment and is not limiting of all embodiments described herein.

The fuel manifolds 200 are conduits that receive fuel for the fuel cells in the stack 108 and distribute the fuel to the cells. The fuel manifolds 200 can be fluidly coupled with a source of the fuel, such as one or more tanks or other containers of the fuel. The fuel manifolds 200 can include orifices that deliver the fuel to the fuel cells in locations that deliver fuel into fuel flow passages. In one embodiment, the fuel is not simply injected from the fuel manifolds 200 through orifices into the air stream through the combustor 106. Instead, the fuel can be directed into flow passages as described in, for example, US 2019/0136761 A1, which is incorporated by reference herein in its entirety. As further shown in FIG. 2, the fuel manifolds 200 can be elongated conduits that are elongated along directions that are parallel to or otherwise along the annular axis 110 of the combustor 106. Alternatively, the fuel manifolds 200 can have another shape, such as rings that encircle the combustor 106.

In one embodiment, the fuel manifolds 200 can be individually controlled. For example, a controller (e.g., hardware circuitry that includes and/or is coupled with one or more processors, such as microprocessors) can control valves which, in turn, control the flow of fuel to different ones of the fuel manifolds 200. The amount of current that is drawn from the fuel cell stack 108 can be controlled (e.g., by the controller) during operation of an engine that includes the assembly 100. The controller can close or open valves to decrease or to increase (respectively) the amount of fuel flowing into the fuel cell stack 108. The amount of fuel flowing into the fuel cell stack 108 can be decreased to decrease the electrical current generated by the fuel cell stack 108, or can be increased to increase the current generated by the fuel cell stack 108. Optionally, no fuel can be delivered to the fuel cell stack 108 via the fuel manifolds 200 to prevent the fuel cell stack 108 from generating any electrical current.

The fuel cell stack 108 directly abuts the combustor 106 along the length of the combustor 106. The fuel cell stack 108 can form the outer surface or boundary of the combustor 106. This can include the fuel cell stack 108 being integrally formed with the combustor 106. This arrangement reduces or eliminates the need to include additional ducting to fluidly couple the fuel cell stack 108 with the combustor 106. The combustor 106 receives unspent fuel and air from the fuel cell stack 108 along radially inward directions oriented toward the annular axis 110 of the combustor 106. The combustor 106 also can receive supplemental fuel and air from the compressor 104. This supplemental fuel and air does not pass or flow through any fuel cells in the fuel cell stack 108, and can flow into the combustor 106 in directions along or parallel to the annular axis 110. The combustor 106 further includes an interior portion 202 that is coupled with the compressor 104 and/or the turbine 112, via, e.g., a shaft (see, e.g., shaft 115 of FIG. 1).

Figure 3:
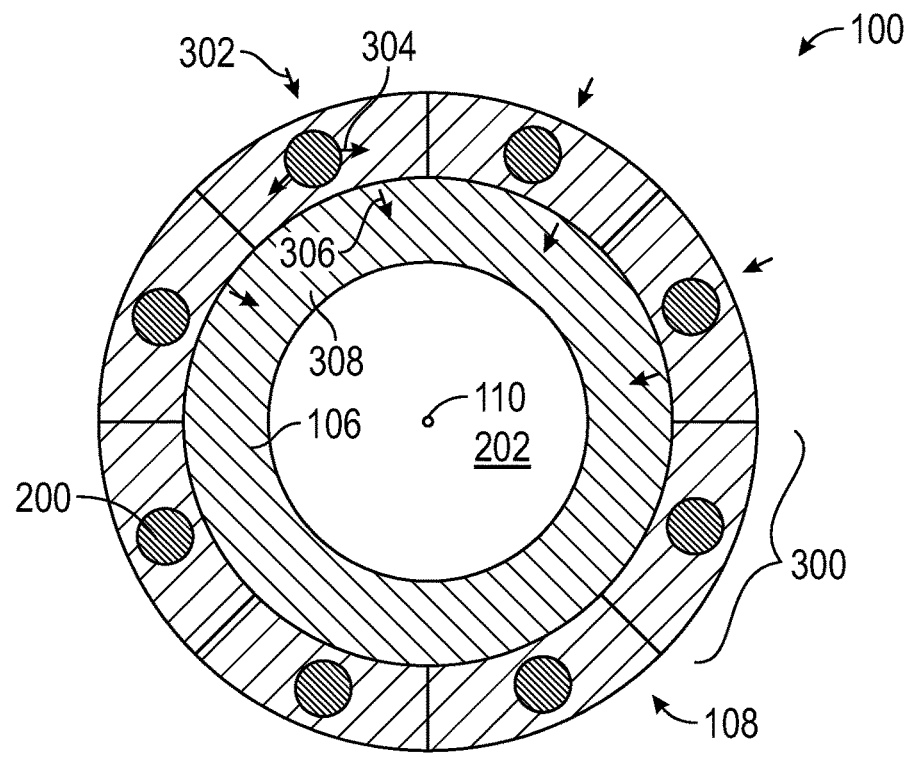
FIG. 3 illustrates a cross-sectional view of the combustion system with an integrated fuel cell shown in FIG. 1 taken along line 3-3 in FIG. 2 according to an embodiment of the present disclosure.

FIG. 3 illustrates a cross-sectional view of one embodiment of a combination of the combustion system with an integrated fuel cell (i.e., the fuel cell and combustor assembly 100 of FIG. 1) along line 3-3 shown in FIG. 2. As shown, the fuel cell stack 108 circumferentially extends around the combustor 106 by completely encircling the combustor 106 around the annular axis 110. The fuel cell stack 108 includes several fuel cells 300 that generate electrical current. These fuel cells 300 are solid oxide fuel cells in one embodiment. Alternatively, the fuel cells 300 can be another type of fuel cell. The fuel cells 300 are formed as parts or segments of an annulus that encircles the combustor 106.

The fuel cells 300 that are visible in FIG. 3 may be a single ring or an annulus of fuel cells 300 that encircles the combustor 106, with many more fuel cells 300 axially stacked together to form the fuel cell stack 108. For example, multiple additional rings of fuel cells 300 may be placed on top of each other to form the fuel cell stack 108 that is elongated along the annular axis 110. While eight fuel cells 300 are shown in the ring in FIG. 3, more or fewer fuel cells 300 can form the ring that encircles the combustor 106.

The fuel cells 300 in the stack 108 are positioned to receive discharged air 302 from the compressor 104 (and/or a pre-burner system as described further below) and fuel 304 from the fuel manifolds 200 (and/or a catalytic partial oxidation convertor as described further below). The fuel cells 300 generate electrical current using this air 302 and at least some of this fuel 304, and radially direct partially oxidized fuel 306 and unused air 308 into the combustor 106 toward the annular axis 110. The combustor 106 combusts the partially oxidized fuel 306 and air 308 into one or more gaseous combustion products (e.g., exhaust), that are directed into and drive the downstream turbine 112.

Figure 4:
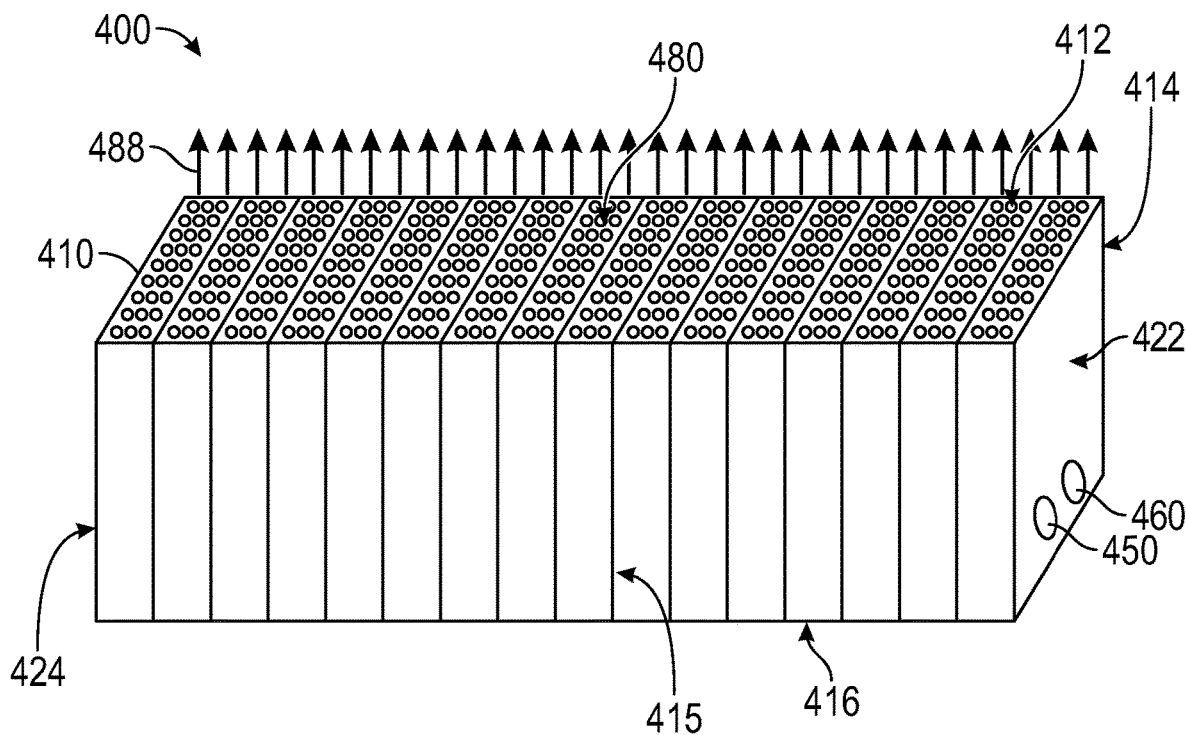
FIG. 4 illustrates a combination of a combustion system with an integrated fuel cell according to an embodiment of the present disclosure.

FIG. 4 illustrates a perspective view of another embodiment of a combination of a combustion system with an integrated fuel cell (i.e., a fuel cell and combustor system 400) that can be used in a gas turbine engine system (e.g., gas turbine engine 102 of FIG. 1), which is further described in, e.g., US 2020/0194799 A1, which is incorporated by reference herein in its entirety. The system 400 includes a housing 410 having a combustion outlet side 412 and a side 416 that is opposite to the combustion outlet side 412, a fuel and air inlet side 422 and a side 424 that is opposite to the fuel and air inlet side 422, and sides 414, 415. The sides 414 and 416 are not visible in the perspective view of FIG. 4. The shape of the housing 410 may differ from what is shown in FIG. 4. For example, the housing 410 need not have a rectangular or a cubic shape, in another embodiment.

The combustion outlet side 412 includes several combustion outlets 480 from which combustion gas(es) 488 is directed out of the housing 410. As described herein, the combustion gas 488 can be created using fuel and air that is not consumed by fuel cells in a fuel cell stack inside the housing 410. This combustion gas 488 can be used to generate propulsion or thrust for a vehicle, such as a manned or an unmanned aircraft.

The fuel and air inlet side 422 includes one or more fuel inlets 450 and one or more air inlets 460. Optionally, one or more of the inlets 450, 460 can be on another side of the housing 410. The fuel inlet 450 is fluidly coupled with a source of fuel for the fuel cells, such as one or more pressurized containers of a hydrogen-containing gas and/or a catalytic partial oxidation convertor as described further below. Alternatively, another type or source of fuel may be used. The air inlet 460 is fluidly coupled with a source of air for the fuel cells, such as air that is discharged from a compressor provided with a gas turbine engine (see, e.g., air 302 coming from the compressor 104 in the gas turbine engine 102 of the embodiment of FIGS. 1 to 3) and/or a pre-burner system as described further below. Alternatively, another source of air may be provided, such as, e.g., one or more pressurized containers of oxygen gas. The inlets 450, 460 separately receive the fuel and air from the external sources of fuel and air, and separately direct the fuel and air into the fuel cells.

In one embodiment, the fuel and air inlet side 422 and the combustion outlet side 412 may be the only sides of the housing 410 that are not sealed. For example, the housing 410 may be sealed to prevent ingress or egress of fluids (gas and/or liquid) into and out of the housing 410, but for the inlets 450, 460 and the combustion outlets 480. The air and fuel that are directed into the housing 410 via the inlets 450, 460 may be entirely or substantially consumed (e.g., at least 98% of the volume or mass is consumed) by the fuel cells inside the housing 410 and/or the generation of combustion gas 488. This can allow for the housing 410 to have no other outlet through which any fuel or air passes aside from the combustion outlets 480 through which the combustion gas 488 exits the housing 410. According to one embodiment, partially oxidized fuel and unused air from the fuel cells inside the housing 410 can be directed into a combustor, such that the combustor combusts the partially oxidized fuel and air into one or more gaseous combustion products (e.g., exhaust), that are directed into and drive a downstream turbine (see, e.g., combustor 106 and turbine 112 of the gas turbine engine 102 of the embodiment of FIGS. 1 to 3).

In one embodiment, the system 400 can be formed from one hundred fuel cells stacked side-by-side from the end or fuel and air inlet side 422 to the opposite side 424. Alternatively, the system 400 can include fewer or more fuel cells stacked side-by-side. According to one embodiment, the system 400 can be eight centimeters tall, 2.5 centimeters wide, and twenty-four centimeters long. Alternatively, the system 400 can be taller or shorter, wider or narrower, and/or longer or shorter than these example dimensions.

According to one embodiment, the combination of the combustion system with an integrated fuel cell (i.e., the fuel cell and combustor system 400) can be integrated into the liner of a combustor such that the combustor is circumferentially surrounded along some or all the length of the combustor by the housing 410 having a fuel cell stack or plurality of fuel cells. Thus, according to this embodiment, the system 400 or housing 410 directly abuts the combustor of, e.g., a gas turbine engine along the length of the combustor (see, e.g., combustor 106 of the gas turbine engine 102 of the embodiment of FIG. 1). The housing 410 can form the outer surface or boundary of the combustor. This can include the housing 410 being integrally formed with the combustor. This arrangement reduces or eliminates the need to include additional ducting to fluidly couple the housing 410 with the combustor. According to another embodiment, the fuel cell stack can be axially coupled to the combustor, meaning the fuel cell stack is upstream of the combustor but not necessarily circumferentially surrounding the combustor.

According to one embodiment, the combustor is fluidly coupled with the housing 410 (see, e.g., combustor 106 of the gas turbine engine 102 of the embodiment of FIGS. 1 to 3). The combustor receives unspent fuel and air (e.g., combustion gas 488) from the housing 410 along radially inward directions oriented toward an annular axis of the combustor (see, e.g., annular axis 110 of the combustor 106 of the embodiment of FIGS. 1 to 3).

According to one embodiment, fuel cells (e.g., SOFCs) within the housing 410 are positioned to receive (i) discharged air from a compressor and/or a pre-burner system as described further below and (ii) fuel from a source, such as, e.g., a catalytic partial oxidation convertor as described further below. The fuel cells within the housing 410 generate electrical current using this air and at least some of this fuel, and radially direct partially oxidized fuel and unused air into the combustor. The combustor combusts the partially oxidized fuel and air into one or more gaseous combustion products (e.g., exhaust), that can be directed into and drive a downstream turbine (see, e.g., combustor 106 and turbine 112 of the gas turbine engine 102 of the embodiment of FIGS. 1 to 3).

Figure 5:
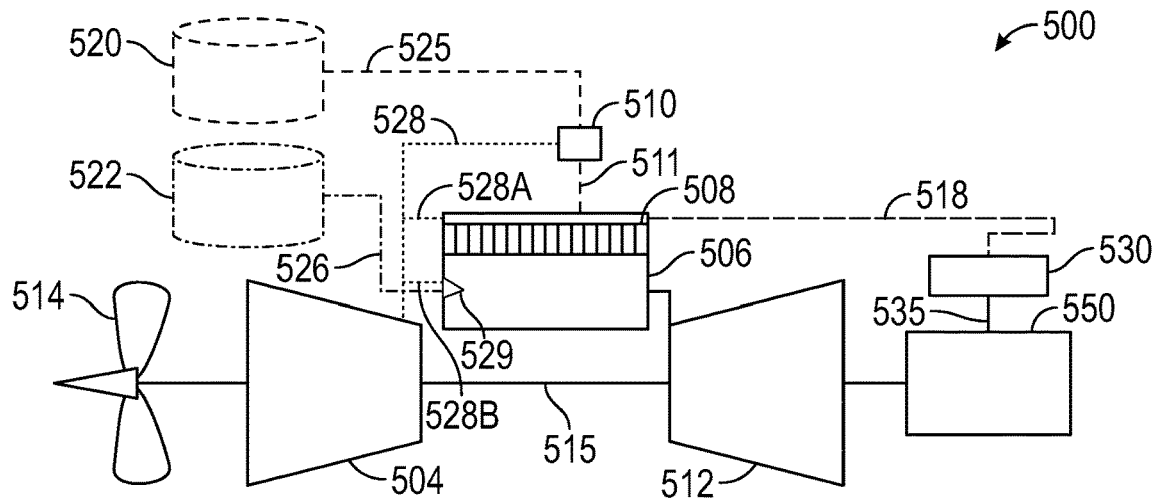
FIG. 5 illustrates a gas turbine engine having a combination of a combustion system with an integrated fuel cell according to one embodiment of the present disclosure.

FIG. 5 illustrates an engine assembly, and more particularly, a gas turbine engine 500 having a combination of a combustion system with an integrated fuel cell according to one embodiment of the present disclosure. As shown in FIG. 5, the gas turbine engine 500 includes a shaft 515 that mechanically connects at least one compressor 504 to a turbine 512. The gas turbine engine 500 further includes a combustor 506 (e.g., a gas turbine combustor), and a fuel cell 508 (or fuel cell stack) having a plurality of fuel cells (e.g., SOFCs) integrated with the combustor 506. According to one embodiment, the fuel cell 508 (e.g., solid oxide fuel cell) is integrated into the outer and/or inner liners of the combustor 506. For example, according to one embodiment, the fuel cell 508 could be integrated into the combustor 506 according to the embodiment illustrated in FIGS. 1 to 3. Alternatively, according to another embodiment, the fuel cell 508 could comprise the system 400 with housing 410 illustrated in FIG. 4, which is then integrated into the outer and/or inner liners of the combustor 506. The fuel cell 508 can also be integrated into the outer and/or inner liners of the combustor 506 in another manner. For example, the exhaust stream from the fuel cell stack can be manifolded directly into the outer and/or inner liners of the combustor 506. Alternatively, part of the fuel cell stack and the combustor liners can be integrated via an additively manufacturing method (e.g., 3-D printing).

As further shown in FIG. 5, the gas turbine engine 500 also includes a catalytic partial oxidation (C-POX) convertor 510 for developing a hydrogen rich fuel stream (e.g., optimizing a hydrogen content of a fuel stream) (see, e.g., fuel stream 511) for fuel cell 508 (e.g., solid oxide fuel cell) that is integrated into the outer and/or inner liners of the combustor 506. The gas turbine engine 500 further includes a fuel source 520 (e.g., a hydrocarbon fuel source, including, e.g., a carbon-neutral fuel or synthetic hydrocarbons) for directing a fuel stream 525 into the catalytic partial oxidation (C-POX) convertor 510 for developing a hydrogen rich fuel stream 511. The hydrogen rich fuel stream 511 is then directed into the fuel cell 508 located in a liner region of the combustor 506. According to another embodiment, the fuel source 520 could be a hydrogen ($H_2$) fuel source, as opposed to a hydrocarbon fuel source. According to this embodiment, the catalytic partial oxidation (C-POX) convertor 510 may not be necessary for this hydrogen ($H_2$) fuel source, and, thus, the hydrogen ($H_2$) fuel stream (e.g., fuel stream 525) can be sent directly into the fuel cell 508 (e.g., SOFC) that is integrated into the outer and/or inner liners of the combustor 506.

The gas turbine engine 500 of FIG. 5 also includes a secondary fuel source 522 (e.g., a hydrocarbon fuel source, including, e.g., a carbon-neutral fuel or synthetic hydrocarbons, such as, e.g., synthetic fuel (i.e., synfuel), which is made from coal, corn, etc., as a substitute for a petroleum product). A fuel stream 526 from this secondary fuel source 522 can be directed into the combustor 506 through a main/pilot fuel nozzle and/or to aid in developing a combustion product within the combustor 506. According to one embodiment, the combustor 506 includes one or more main/pilot fuel nozzles and/or injectors 529 with a mixer and/or swirler that can aid in at least partially mixing air and fuel to facilitate combustion of fuel and air, the main/pilot flames being configured to combust the fuel directed into the combustor from the fuel cell stack into the one or more gaseous combustion products.

As further shown in FIG. 5, the compressor 504 of the gas turbine engine 500 receives inlet air (not shown) and compresses this air via one or more stages of rotating blades. The compressed air 528 is then directed into the catalytic partial oxidation (C-POX) convertor 510 for developing a hydrogen rich fuel stream (e.g., optimizing a hydrogen content of a fuel stream) (see, e.g., fuel stream 511) for the fuel cell 508 (e.g., solid oxide fuel cell) that is integrated into the outer and/or inner liners of the combustor 506. Portions of the compressed air 528, i.e., portion 528A and portion 528B, are also directed into the fuel cell 508 and the combustor 506, respectively, to facilitate the functioning of the fuel cell 508 and the combustor 506.

In the embodiment of FIG. 5, the fuel cell 508 that is integrated into the outer and/or inner liners of the combustor 506 converts the fuel stream 511 and compressed air 528A sent into the fuel cell 508 into electrical energy 518 (e.g., DC current). This electrical energy or DC current 518 is directed into an AC/DC convertor 530 in order to change the DC current 518 into AC current 535 that can be effectively utilized by one or more subsystems 550, such as, e.g., a generator, a fan, or other electrical machine. In addition, partially oxidized fuel and air exhaust from the fuel cell 508 flow radially inward into the combustor 506. The partially consumed fuel and air exhaust from the fuel cell 508, additional air (e.g., compressed air 528B) from the compressor 504, and/or additional fuel from the one or more fuel injectors 529 (e.g., fuel stream 526 from secondary fuel source 522) are combusted within the combustor 506. Exhaust from the combusted fuel and air mixture is then directed into the turbine 512, which converts the exhaust into energy via the rotating shaft 515 that can be used to power one or more loads 514, such as a fan used to propel a vehicle (e.g., an aircraft), a generator, or the like. According to one embodiment, the shaft 515 is a single shaft that connects the fan 514 to the compressor 504 and the turbine 512. According to another embodiment, the shaft 515 comprises (i) an outer shaft that connects the compressor 504 to the turbine 512, and (ii) an inner shaft that connects the fan 514 to the turbine 512. Although the embodiment of FIG. 5 illustrates a fan 514 being mechanically connected to the turbine 512 via the shaft 515, this fan 514 could be alternatively omitted from the gas turbine engine 500 (see, e.g., gas turbine engine 600/700 of FIGS. 6 and 7, respectively).

Figure 6:
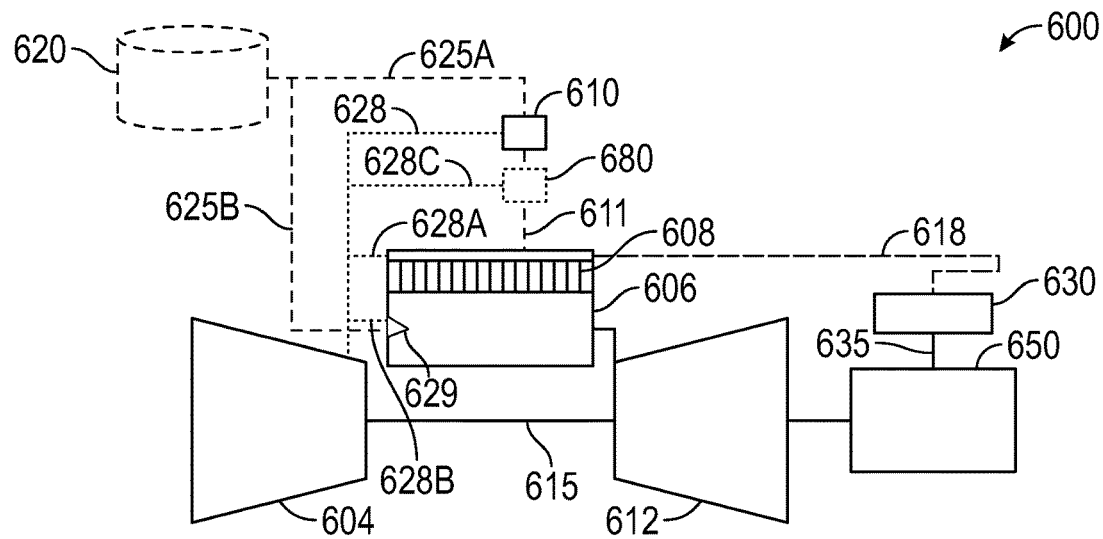
FIG. 6 illustrates a gas turbine engine having a combination of a combustion system with an integrated fuel cell according to another embodiment of the present disclosure.

FIG. 6 illustrates an engine assembly, and more particularly, a gas turbine engine 600 having a combination of a combustion system with an integrated fuel cell according to another embodiment of the present disclosure. As shown in FIG. 6, the gas turbine engine 600 includes a shaft 615 that mechanically connects at least one compressor 604 to a turbine 612. The gas turbine engine 600 further includes a combustor 606 (e.g., a gas turbine combustor), and a fuel cell 608 (or fuel cell stack) having a plurality of fuel cells (e.g., SOFCs) integrated with the combustor 606. According to one embodiment, the fuel cell 608 (e.g., solid oxide fuel cell) is integrated into the outer and/or inner liners of the combustor 606. For example, according to one embodiment, the fuel cell 608 could be integrated into the combustor 606 according to the embodiment illustrated in FIGS. 1 to 3. Alternatively, according to another embodiment, the fuel cell 608 could comprise the system 400 with housing 410 illustrated in FIG. 4, which is then integrated into the outer and/or inner liners of the combustor 606. The fuel cell 608 can also be integrated into the outer and/or inner liners of the combustor 606 in another manner.

As further shown in FIG. 6, the gas turbine engine 600 also includes a catalytic partial oxidation (C-POX) convertor 610 for developing a hydrogen rich fuel stream (e.g., optimizing a hydrogen content of a fuel stream) (see, e.g., fuel stream 611) for fuel cell 608 (e.g., solid oxide fuel cell) that is integrated into the outer and/or inner liners of the combustor 606. The gas turbine engine 600 further includes a fuel source 620 (e.g., a hydrocarbon fuel source, including, e.g., a carbon-neutral fuel or synthetic hydrocarbons) for directing a fuel stream 625A into the catalytic partial oxidation (C-POX) convertor 610 for developing a hydrogen rich fuel stream 611. The hydrogen rich fuel stream 611 is then directed into the fuel cell 608 located in a liner region of the combustor 606. According to another embodiment, the fuel source 620 could be a hydrogen ($H_2$) fuel source, as opposed to a hydrocarbon fuel source. According to this embodiment, the catalytic partial oxidation (C-POX) convertor 610 may not be necessary for this hydrogen ($H_2$) fuel source, and, thus, the hydrogen ($H_2$) fuel stream (e.g., fuel stream 625A) can sent directly into the fuel cell 608 (e.g., SOFC) that is designed/integrated into the outer and/or inner liners of the combustor 606.

In contrast to the gas turbine engine 500 of the embodiment of FIG. 5, the gas turbine engine 600 of the embodiment of FIG. 6 does not include a secondary fuel source (e.g., secondary fuel source 522 of the embodiment of FIG. 5). Thus, a secondary fuel stream 625B is directed into the combustor 606 from the fuel source 620 to run a main/pilot flame (not shown) within the combustor 606 and/or to aid in developing a combustion product within the combustor 606.

As further shown in FIG. 6, the compressor 604 of the gas turbine engine 600 receives inlet air (not shown) and compresses this air via one or more stages of rotating blades. The compressed air 628 is then directed into the catalytic partial oxidation (C-POX) convertor 610 for developing a hydrogen rich fuel stream (e.g., optimizing a hydrogen content of a fuel stream) (see, e.g., fuel stream 611) for the fuel cell 608 (e.g., solid oxide fuel cell) that is designed into the outer and/or inner liners of the combustor 606. Portions of the compressed air 628, i.e., portion 628A and portion 628B, are also directed into the fuel cell 608 and the combustor 606, respectively, to facilitate the functioning of the fuel cell 608 and the combustor 606.

Similar to the embodiment of FIG. 5, in the embodiment of FIG. 6, the fuel cell 608 that is integrated into the outer and/or inner liners of the combustor 606 converts the fuel 611 and compressed air 628A sent into the fuel cell 608 into electrical energy 618 (e.g., DC current). This electrical energy or DC current 618 is directed into an AC/DC convertor 630 in order to change the DC current 618 into AC current 635 that can be effectively utilized by one or more subsystems 650, such as, e.g., a generator, fan, or other electrical machine. In addition, partially oxidized fuel and air exhaust from the fuel cell 608 flow radially inward into the combustor 606. The partially consumed fuel and air exhaust from the fuel cell 608, additional air (e.g., compressed air 628B) from the compressor 604, and/or additional fuel from one or more fuel injectors 629 (e.g., fuel stream 625B from fuel source 620) are combusted within the combustor 606. Exhaust from the combusted fuel and air mixture is then directed into the turbine 612, which converts the exhaust into energy via the rotating shaft 615 that can be used to power one or more loads (not shown).

As further shown in FIG. 6, according to one embodiment, a heat exchanger 680 can optionally be included between the catalytic partial oxidation (C-POX) convertor 610 and the fuel cell 608 located in a liner region of the combustor 606. According to this embodiment, when this heat exchanger 680 is included, the heat exchanger is configured to condition air and/or fuel (i.e., fuel stream 611) going into the fuel cell 608 from the catalytic partial oxidation (C-POX) convertor 610. Moreover, according to this embodiment, when this heat exchanger 680 is included, another portion of the compressed air 628 from the compressor 604, i.e., portion 628C, is directed into the heat exchanger 680 to control the air temperature. A portion of this heated air 628C may be directed into (not shown) and utilized within the fuel cell 608 or directed (not shown) into the combustor 606 and combusted within the combustor 606 with the fuel 625B directed into the combustor 606. Depending on the available heat generated from the catalytic partial oxidation (C-POX) convertor 610, the flow rates of the portions of discharged air 628A, 628B and 628C being discharged from the compressor 604 can be controlled to control the temperature of fuel stream 611 exiting the heat exchanger 680 into the fuel cell 608. For example, if there is excessive heat available at the heat exchanger 680, the air flow 628C can be increased to absorb more heat and then directed to the fuel cell 608 and/or the combustor 606, in which case the air flow 628A directed to the fuel cell 608 and/or the air flow 628B directed to the combustor can be decreased accordingly.

Figure 7:
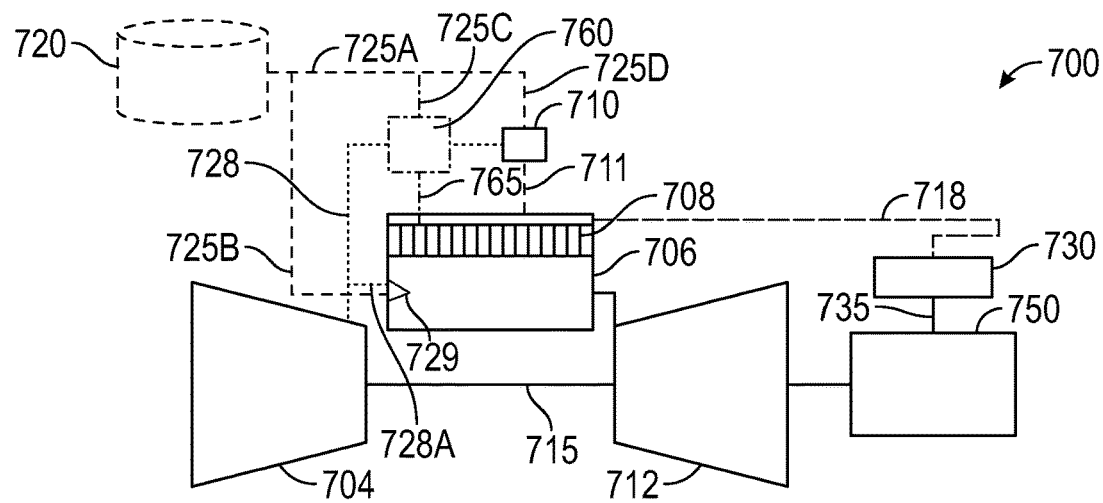
FIG. 7 illustrates a gas turbine engine having a combination of a combustion system with an integrated fuel cell according to yet another embodiment of the present disclosure.

FIG. 7 illustrates an engine assembly, and more particularly, a gas turbine engine 700 having a combination of a combustion system with an integrated fuel cell according to another embodiment of the present disclosure. As shown in FIG. 7, the gas turbine engine 700 includes a shaft 715 that mechanically connects at least one compressor 704 to a turbine 712. The gas turbine engine 700 further includes a combustor 706 (e.g., a gas turbine combustor), and a fuel cell 708 (or fuel cell stack) having a plurality of fuel cells (e.g., SOFCs) integrated with the combustor 706. According to one embodiment, the fuel cell 708 (e.g., solid oxide fuel cell) is designed into the outer and/or inner liners of the combustor 706. For example, according to one embodiment, the fuel cell 708 could be integrated into the combustor 706 according to the embodiment illustrated in FIGS. 1 to 3. Alternatively, according to another embodiment, the fuel cell 708 could comprise the system 400 with housing 410 illustrated in FIG. 4, which is then integrated into the outer and/or inner liners of the combustor 706. The fuel cell 708 can also be integrated into the outer and/or inner liners of the combustor 706 in another manner.

As further shown in FIG. 7, the gas turbine engine 700 also includes a catalytic partial oxidation (C-POX) convertor 710 for developing a hydrogen rich fuel stream (e.g., optimizing a hydrogen content of a fuel stream) (see, e.g., fuel stream 711) for fuel cell 708 (e.g., solid oxide fuel cell) that is designed into the outer and/or inner liners of the combustor 706. The gas turbine engine 700 further includes a pre-burner system 760, for raising the temperature of air 728 that is discharged from the compressor 704 to a temperature high enough to enable fuel cell temperature control (e.g., ~600° C. to 800° C.). According to one embodiment, the pre-burner system 760 and the catalytic partial oxidation (C-POX) convertor 710 are manifolded together to provide conditioned air and fuel to the fuel cell 708. According to an embodiment, the catalytic partial oxidation (C-POX) convertor 710, the pre-burner system 760, and the fuel cell 708 and/or fuel cell stack having a plurality of fuel cells (e.g., SOFCs) are closely coupled within the gas turbine engine 700 (or engine assembly), such that the catalytic partial oxidation (C-POX) convertor 710, the pre-burner system 760, and the fuel cell 708 and/or fuel cell stack are positioned as close as possible to each other within the gas turbine engine 700 (or engine assembly). The gas turbine engine 700 further includes a fuel source 720 (e.g., a hydrocarbon fuel source, including, e.g., a carbon-neutral fuel or synthetic hydrocarbons) for directing a fuel stream 725A into the catalytic partial oxidation (C-POX) convertor 710 and the pre-burner system 760. In particular, as shown in the embodiment of FIG. 7, a first portion of fuel 725C from the fuel stream 725A of fuel source 720 is directed to the pre-burner system 760, while a second portion of fuel 725D from the fuel stream 725A of fuel source 720 is directed to the catalytic partial oxidation (C-POX) convertor 710 for developing a hydrogen rich fuel stream (e.g., optimizing a hydrogen content of a fuel stream) (e.g., fuel stream 711). As the temperature of the air 728 that is discharged from the compressor 704 is raised to the desired temperature (e.g., 600° C. to 800° C.) within the pre-burner system 760, this heated air 765 is then directed into the fuel cell 708 to facilitate the functioning of the fuel cell 708 (e.g., SOFC) located in a liner region of the combustor 706. In parallel, the portion of fuel 725D that is directed from the fuel stream 725A of fuel source 720 into the catalytic partial oxidation (C-POX) convertor 710 is developed into a hydrogen rich fuel stream 711 that is also fed into the fuel cell 708.

According to another embodiment, the fuel source 720 could be a hydrogen ($H_2$) fuel source, as opposed to a hydrocarbon fuel source. According to this embodiment, the catalytic partial oxidation (C-POX) convertor 710 may not be necessary for this hydrogen ($H_2$) fuel source, and, thus, the hydrogen ($H_2$) fuel stream (e.g., fuel stream 725D) can sent directly into the fuel cell 708 (e.g., SOFC) that is integrated into the outer and/or inner liners of the combustor 706.

According to yet another embodiment, the pre-burner system 760 of FIG. 7 could alternatively be a heat exchanger or another device for raising the temperature of the air 728 that is discharged from the compressor 704 to a temperature high enough to enable fuel cell temperature control (e.g., ~600° C. to 800° C.).

Similar to the gas turbine engine 600 of the embodiment of FIG. 6, the engine 700 of the embodiment of FIG. 7 does not include a secondary fuel source (e.g., secondary fuel source 522 of the embodiment of FIG. 5). Thus, a secondary fuel stream 725B is directed into the combustor 706 from the fuel source 720 to run a main/pilot flame (not shown) within the combustor 706 and/or to aid in developing a combustion product within the combustor 706.

As further shown in FIG. 7, the compressor 704 of the gas turbine engine 700 receives inlet air (not shown) and compresses this air via one or more stages of rotating blades. The compressed air 728 is then directed into (i) the pre-burner system 760, as discussed above, for raising the temperature of air 765 that is directed into the fuel cell 708, and (ii) the catalytic partial oxidation (C-POX) convertor 710 for developing a hydrogen rich fuel stream (e.g., optimizing a hydrogen content of a fuel stream) (see, e.g., fuel stream 711) for the fuel cell 708 (e.g., solid oxide fuel cell) that is designed into the outer and inner liners of the combustor 706. A portion of the compressed air 728, i.e., portion 728A, is also directed into the combustor 706 to facilitate the functioning of the combustor 706.

Similar to the embodiments of FIGS. 5 and 6, the fuel cell 708 that is integrated into the outer and/or inner liners of the combustor 706 converts the fuel 711 and air 765 sent into the fuel cell 708 into electrical energy 718 (e.g., DC current). This electrical energy or DC current 718 is directed into an AC/DC convertor 730 in order to change the DC current 718 into AC current 735 that can be effectively utilized by one or more subsystems 750, such as, e.g., a generator, fan, or other electrical machine. In addition, partially oxidized fuel and air exhaust from the fuel cell 708 flow radially inward into the combustor 706. The partially consumed fuel and air exhaust from the fuel cell 708, additional air (e.g., compressed air 728A) from the compressor 704, and/or additional fuel from one or more fuel injectors 729 (e.g., fuel stream 725B from fuel source 720) are combusted within the combustor 706. Exhaust from the combusted fuel and air mixture is then directed into the turbine 712, which converts the exhaust into energy via the rotating shaft 715 that can be used to power one or more loads (not shown).

According to one embodiment of the present disclosure, by incorporating or integrating the fuel cell (508, 608, 708) (e.g., SOFC) along the combustor liner of the combustor (506, 606, 706) for a gas turbine engine (500, 600, 700) (e.g., an aircraft engine), in which a compressor (504, 604, 704) is connected to the combustor (506, 606, 706) upstream of the combustor (506, 606, 706) and a turbine (512, 612, 712) is connected to the combustor (506, 606, 706) downstream of the combustor (506, 606, 706), both air and fuel can be directed to the fuel cell (508, 608, 708) (SOFC) in a single pass, meaning there is no recycling of the unburned fuel or air from the fuel cell exhaust to the inlet of the fuel cell (508, 608, 708). Thus, there is no need for a separate air supply or any related control means in this configuration. However, because the inlet air for the fuel cell (508, 608, 708) (e.g., SOFC) comes solely from the upstream engine compressor (504, 604, 704) without any other separately controlled air source, the inlet air for the fuel cell (508, 608, 708) that is discharged from the compressor (504, 604, 704) is subject to the air temperature changes that occur at different flight stages. For example, the air within the aircraft engine compressor may work at 200° C. during idle, 600° C. during take-off, 450° C. during cruise, etc. This type of temperature change to the inlet air directed to the fuel cell may lead to significant thermal transient issues (or even thermal shock) to the ceramic materials of the fuel cell (e.g., SOFC), which could range from cracking to failure. Thus, according to embodiments of the present disclosure, by fluidly connecting a pre-burner system 760 to (i) the engine compressor 704 (at an upstream side to the pre-burner system 760) and (ii) the fuel cell 708 (e.g., SOFC) (at a downstream side to the pre-burner system 760), the pre-burner system 760 serves as a control device or system to maintain the air 765 being directed into the fuel cell 708 at a temperature at a desired range (e.g., 700° C.±200° C.). Furthermore, by integrating the pre-burner system 760 with the catalytic partial oxidation (C-POX) convertor 710, a better thermal management with faster startup could be achieved. This further improves the system operability.

In one embodiment, the diversion of fuel (e.g., fuel portions 725A, 725B, 725C and/or 725D) from the fuel source 720 can be individually controlled to better manage the temperature of the air 765 being directed into the fuel cell 708. For example, a controller (e.g., hardware circuitry that includes and/or is coupled with one or more processors, such as microprocessors) can control valves which, in turn, control the flow of fuel to the pre-burner system 760 and/or the catalytic partial oxidation convertor 710. The temperature of the air 728 that is discharged from the compressor 704 can be controlled by controlling the flow of fuel to the pre-burner system 760 via the controller. For example, the controller can close or open valves to decrease or to increase (respectively) the amount of fuel flowing into the pre-burner system 760. The amount of fuel flowing into the pre-burner system 760 can be decreased to thereby decrease the temperature of the air 728 that is discharged from the compressor 704 and directed into the pre-burner system 760, or can be increased to thereby increase the temperature of the air 728 that is discharged from the compressor 704 and directed into the pre-burner system 760. Optionally, no fuel can be delivered to the pre-burner system 760 via the fuel source 720 to prevent the pre-burner system 760 from increasing and/or decreasing the temperature of the air 728 that is discharged from the compressor 704 and directed into the pre-burner system 760.

Figure 8:
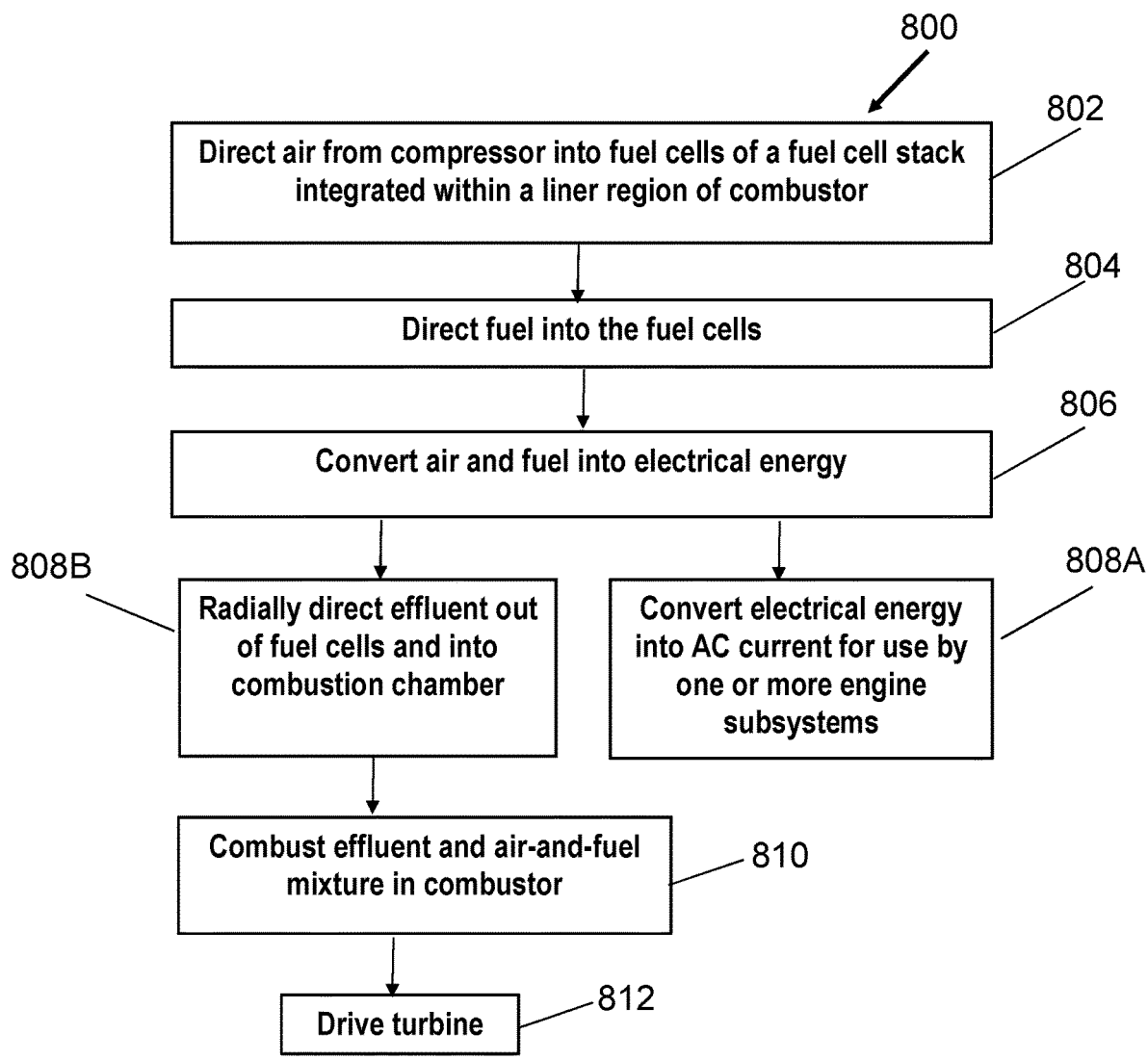
FIG. 8 illustrates a flowchart of one embodiment of a method of operating an integrated fuel cell and a combustor assembly.

FIG. 8 illustrates a flowchart of one embodiment of a method 800 of operating an integrated fuel cell and a combustor assembly. The method 800 can describe the operations performed in generating thrust and electrical current using the integrated fuel cell and combustor assemblies described herein (see, e.g., FIGS. 1 and 4 to 7). At step 802, air that is discharged from a compressor of an engine is directed into fuel cells of a fuel cell stack of the integrated fuel cell and combustor assembly. According to one embodiment, this air can be preheated by a pre-burner system (see, e.g., pre-burner system 760 of FIG. 7) prior to being directed into the fuel cells. According to another embodiment, this air can be preheated by a heat exchanger (see, e.g., heat exchanger 680 of FIG. 6) using heat generated from a catalytic partial oxidation (C-POX) convertor (see, e.g., catalytic partial oxidation (C-POX) convertor 610 of FIG. 6). At step 804, fuel is directed into the fuel cells of the integrated fuel cell and combustor assembly via a fuel source and/or a catalytic partial oxidation convertor. The direction of fuel into the fuel cells (at step 804) and the flow of air into the fuel cells (at step 802) can occur simultaneously, concurrently, sequentially, or in a reverse order than as shown in FIG. 8.

At step 806, the air and fuel in the fuel cells are at least partially converted into electrical energy. For example, the fuel cells can be connected in a series to build up a direct current that is created in the fuel cells. For example, at step 808A, this electrical energy or DC current is converted into AC current to be used to power one or more engine subsystems, such as a fan of the engine, a generator, another load, or used to charge a battery. At step 808B, effluent of the fuel cells is radially directed inward into the combustor. The effluent can include unused air, unburned fuel, and/or other gaseous constituents of the fuel cells. At step 810, the effluent is combusted (at least partially) in the combustor. Additional air from the compressor and/or fuel from fuel injectors can be directed into the combustor to aid with the combustion. The combustion in the combustor generates gaseous combustion products. At step 812, a turbine of the engine is driven by the gaseous combustion products in the combustor. For example, exhaust from the combustor may be directed into the turbine to rotate the turbine via, e.g., a shaft.

Thus, in accordance with the principles of the present disclosure, an engine system is provided that combines a fuel cell (e.g., SOFC) and a catalytic partial oxidation (C-POX) convertor/reformer as a pre-combustor on an engine system, such as, e.g., a jet engine system, for power generation and propulsion for aviation platforms.

According to one embodiment of the present disclosure, an engine system is provided that can operate on carbon neutral fuels (e.g., CNLF ethanol and/or CNLF synfuel) and can achieve high cruise efficiency at reduced emissions.

In accordance with the principles of the present disclosure, the integration of a fuel cell and a catalytic partial oxidation (C-POX) convertor/reformer as a pre-combustor to a gas turbine generator set (i.e., genset) can produce power. For example, shaft (or mechanical) power can be converted into AC electric power and subsequently into DC power. Additionally, some of the shaft (or mechanical) power can be used for propulsion, if, for example, a fan is connected to the shaft.

According to one embodiment of the present disclosure, AC power can be supplied instead of DC power.

According to one embodiment of the present disclosure, a combined system having a fuel cell and a catalytic partial oxidation (C-POX) convertor/reformer as a pre-combustor on an engine system is anticipated to have a very high cruise efficiency and fuel flexibility from various fuels, including carbon neutral liquid fuels (CNLF).

In accordance with the principles of the present disclosure, a combined system having a fuel cell and a catalytic partial oxidation (C-POX) convertor/reformer as a pre-combustor on an engine system is anticipated to deliver DC power at over 60% cruise efficiency, while being able to operate on carbon neutral liquid fuels (CNLF), such as, e.g., ethanol, synfuel and others.

According to one embodiment of the present disclosure, a combined system is developed that minimizes the total number of components, while also being compact, and still having high power density.

According to one embodiment of the present disclosure, the integration of a fuel cell (e.g., SOFC) around an annular and/or canned combustor allows for a high power density operation, while fuel heat release can be balanced between the fuel cell and the combustor. Additionally, according to an embodiment of the present disclosure, unburned products from the fuel cell (e.g., approximately 50% to 85%) can still be burned in the combustor.

According to one embodiment of the present disclosure, a catalytic partial oxidation (C-POX) convertor provides pre-heating of air and fuel and can be combined with a heat-exchanger. According to another embodiment of the present disclosure, the catalytic partial oxidation (C-POX) convertor can send heat to a turbine.

According to one embodiment of the present disclosure, a compressor (e.g., a genset compressor) can supply high pressure air leveraging all synergies provided by the system.

According to one embodiment of the present disclosure, a heat exchanger is provided that conditions air and fuel going into a combustor having an integrated fuel cell (SOFC), which uses waste heat from a catalytic partial oxidation (C-POX) convertor included with the engine system.

In accordance with the principles of the present disclosure, a high efficiency propulsion system is provided that delivers fuel savings.

In accordance with the principles of the present disclosure, an engine system is provided that has the ability to operate on carbon neutral liquid fuels (CNLF), which effectively has zero or low greenhouse gas emissions.

In accordance with the principles of the present disclosure, the inclusion of a fuel cell (e.g., SOFC) with the combustor and engine system yields low NOx emissions.

In accordance with the principles of the present disclosure, a combined system having a fuel cell and a catalytic partial oxidation (C-POX) convertor/reformer as a pre-combustor on an engine system provides more than 10× to 20× kW/kg specific power density improvement over a metal supported fuel cell (MS-SOFC).

In accordance with the principles of the present disclosure, a combined system having a fuel cell and a catalytic partial oxidation (C-POX) convertor/reformer as a pre-combustor on an engine system provides up to 75% (e.g., around 60% to 75%) electrochemical voltage efficiency.

In accordance with the principles of the present disclosure, a combined system having a fuel cell and a catalytic partial oxidation (C-POX) convertor/reformer as a pre-combustor on an engine system provides a significant balance of plant savings compared to conventional SOFC-GT hybrid systems, such that otherwise unutilized fuel cell products and heat go directly into the combustor.

In accordance with the principles of the present disclosure, a combined system having a fuel cell and a catalytic partial oxidation (C-POX) convertor/reformer as a pre-combustor on an engine system provides a fast response of the fuel cell (e.g., SOFC) for electrochemical output.

According to one embodiment of the present disclosure, the embedding or integrating of the fuel cell (e.g., SOFC) with the combustor eliminates the need for a separate pressure vessel and/or piping for the fuel cell.

In accordance with the principles of the present disclosure, a combined system having a fuel cell and a catalytic partial oxidation (C-POX) convertor/reformer as a pre-combustor on an engine system is provided that can achieve high efficiency (e.g., at least 60%) with minimal changes to existing propulsion systems, while also having the ability to work on a variety of liquified jet fuels. Moreover, while the fuel cell (e.g., SOFC) is able to run on hydrogen ($H_2$) fuel, there is no need for a hydrogen fuel infrastructure.

In accordance with the principles of the present disclosure, a combined system is provided that internally integrates a fuel cell (SOFC), a catalytic partial oxidation (C-POX) convertor, and a gas turbine engine into a single arrangement with a compact design.

In accordance with the principles of the present disclosure, a combined system having a fuel cell and a catalytic partial oxidation (C-POX) convertor/reformer as a pre-combustor on an engine system thermodynamically recovers waste heat from the catalytic partial oxidation (C-POX) convertor/reformer and the fuel cell, thereby yielding nearly 100% efficient thermoelectric conversion.

In accordance with the principles of the present disclosure, a combined system having a fuel cell and a catalytic partial oxidation (C-POX) convertor/reformer as a pre-combustor on an engine system is provided that can run on synfuel, which allows for (i) at least 58% cruise electricity production and/or (ii) at least 70% carbon dioxide ($CO_2$) emission reduction.

Further aspects of the present disclosure are provided by the subject matter of the following clauses.

An engine assembly comprising: (a) a combustor; (b) a fuel cell stack integrated with the combustor, the fuel cell stack configured (i) to direct fuel and air exhaust from the fuel cell stack into the combustor and (ii) to generate electrical energy; (c) a catalytic partial oxidation convertor that is fluidly connected to the fuel cell stack, the catalytic partial oxidation convertor being configured to optimize a hydrogen content of a fuel stream to be directed into the fuel cell stack; and (d) one or more subsystems electrically connected with the fuel cell stack, the one or more subsystems being configured to receive the electrical energy generated by the fuel cell stack, wherein the combustor is configured to combust the fuel and air exhaust from the fuel cell stack into one or more gaseous combustion products that drive a downstream turbine.

The engine assembly of any preceding clause, further comprising a compressor that is fluidly connected upstream of (i) the combustor and (ii) the catalytic partial oxidation convertor, the compressor being configured to direct a portion of air into the catalytic partial oxidation convertor.

The engine assembly of any preceding clause, further comprising a fuel source that provides fuel and is fluidly connected to the catalytic partial oxidation convertor, wherein a portion of the fuel is directed from the fuel source to the catalytic partial oxidation convertor to optimize the hydrogen content of the fuel stream directed into the fuel cell stack.

The engine assembly of any preceding clause, wherein the fuel source comprises at least one of kerosene fuels and synthetic analogues, bio-jet fuels, synthetic gasoline, bio-diesel, methanol, dimethyl ether (DME), ethanol, glycerol, formic acid, ammonia, hydrazine hydrate, liquid hydrogen, compressed hydrogen, and combinations thereof.

The engine assembly of any preceding clause, further comprising a secondary fuel source that provides fuel and is fluidly connected to the combustor.

The engine assembly of any preceding clause, further comprising an AC/DC convertor configured to convert DC current of the electrical energy generated by the fuel cell stack into AC current to power the one or more subsystems.

The engine assembly of any preceding clause, further comprising a pre-burner system fluidly connected to the fuel cell stack, the pre-burner system being configured to control a temperature of an air flow directed into the fuel cell stack to 700° C.±200° C.

The engine assembly of any preceding clause, wherein the catalytic partial oxidation convertor, the pre-burner system, and the fuel cell stack are closely coupled within the engine assembly.

The engine assembly of any preceding clause, further comprising a fuel source that provides fuel and is fluidly connected to the pre-burner system and the catalytic partial oxidation convertor, wherein (i) a first portion of the fuel is directed from the fuel source to the pre-burner system to raise a temperature of a portion of air directed into the pre-burner system from a compressor and (ii) a second portion of the fuel is directed from the fuel source to the catalytic partial oxidation convertor for optimizing the hydrogen content of the fuel stream to be directed into the fuel cell stack.

The engine assembly of any preceding clause, wherein the combustor comprises one or more main/pilot fuel nozzles being configured to combust the fuel and air exhaust directed into the combustor from the fuel cell stack into the one or more gaseous combustion products.

The engine assembly of any preceding clause, further comprising the downstream turbine connected to the combustor downstream of the combustor.

The engine assembly of any preceding clause, further comprising a heat exchanger that is fluidly connected to the catalytic partial oxidation convertor and the fuel cell stack, the heat exchanger being configured to condition inlet air and/or fuel entering the fuel cell stack or the combustor.

The engine assembly of any preceding clause, wherein the fuel cell stack is at least one of (i) circumferentially surrounding the combustor and (ii) axially coupled to the combustor.

The engine assembly of any preceding clause, wherein the fuel cell stack is integrated within at least one of an inner liner and an outer liner of the combustor.

The engine assembly of any preceding clause, wherein the fuel cell stack is a solid oxide fuel cell stack.

An engine assembly comprising: (a) a combustor; (b) a fuel cell stack integrated with the combustor, the fuel cell stack configured (i) to direct fuel and air exhaust from the fuel cell stack into the combustor and (ii) to generate electrical energy; (c) a catalytic partial oxidation convertor that is fluidly connected to the fuel cell stack, the catalytic partial oxidation convertor being configured to optimize a hydrogen content of a fuel stream to be directed into the fuel cell stack; (d) an AC/DC convertor configured to convert DC current of the electrical energy generated by the fuel cell stack into AC current; and (e) one or more subsystems electrically connected with the fuel cell stack, the one or more subsystems being configured to receive the AC current, wherein the combustor is configured to combust the fuel and air exhaust from the fuel cell stack into one or more gaseous combustion products that drive a downstream turbine.

The engine assembly of any preceding clause, further comprising a compressor that is fluidly connected upstream of (i) the combustor and (ii) the catalytic partial oxidation convertor, the compressor being configured to direct a portion of air into the catalytic partial oxidation convertor.

The engine assembly of any preceding clause, further comprising a fuel source that provides fuel and is fluidly connected to the catalytic partial oxidation convertor, wherein a portion of the fuel is directed from the fuel source to the catalytic partial oxidation convertor to optimize the hydrogen content of the fuel stream directed into the fuel cell stack.

The engine assembly of any preceding clause, wherein the fuel source comprises at least one of kerosene fuels and synthetic analogues, bio-jet fuels, synthetic gasoline, bio-diesel, methanol, dimethyl ether (DME), ethanol, glycerol, formic acid, ammonia, hydrazine hydrate, liquid hydrogen, compressed hydrogen, and combinations thereof.

The engine assembly of any preceding clause, further comprising a secondary fuel source that provides fuel and is fluidly connected to the combustor.

The engine assembly of any preceding clause, further comprising a pre-burner system fluidly connected to the fuel cell stack, the pre-burner system being configured to control a temperature of an air flow directed into the fuel cell stack to 700° C.±200° C.

The engine assembly of any preceding clause, wherein the catalytic partial oxidation convertor, the pre-burner system, and the fuel cell stack are closely coupled within the engine assembly.

The engine assembly of any preceding clause, further comprising a fuel source that provides fuel and is fluidly connected to the pre-burner system and the catalytic partial oxidation convertor, wherein (i) a first portion of the fuel is directed from the fuel source to the pre-burner system to raise a temperature of a portion of air directed into the pre-burner system from a compressor and (ii) a second portion of the fuel is directed from the fuel source to the catalytic partial oxidation convertor for optimizing the hydrogen content of the fuel stream to be directed into the fuel cell stack.

The engine assembly of any preceding clause, wherein the combustor comprises one or more main/pilot fuel nozzles being configured to combust the fuel and air exhaust directed into the combustor from the fuel cell stack into the one or more gaseous combustion products.

The engine assembly of any preceding clause, further comprising the downstream turbine connected to the combustor downstream of the combustor.

The engine assembly of any preceding clause, further comprising a heat exchanger that is fluidly connected to the catalytic partial oxidation convertor and the fuel cell stack, the heat exchanger being configured to condition inlet air and/or fuel entering the fuel cell stack or the combustor.

A method comprising: (a) directing air from a compressor into fuel cells of a fuel cell stack integrated with a combustor of a turbine engine; (b) directing fuel into the fuel cells of the fuel cell stack; (c) converting at least some of the air and fuel that enters the fuel cells of the fuel cell stack into electrical energy; (d) converting the electrical energy into AC current for use by one or more engine systems; (e) radially directing fuel and air exhaust from the fuel cell stack into a combustor; (f) combusting the fuel and air exhaust into gaseous combustion products in the combustor; and (g) driving a turbine of a turbine engine using the gaseous combustion products.

Although the foregoing description is directed to the preferred embodiments, it is noted that other variations and modifications will be apparent to those skilled in the art, and may be made without departing from the spirit or scope of the disclosure. Moreover, features described in connection with one embodiment may be used in conjunction with other embodiments, even if not explicitly stated above.

The invention claimed is:

1. An engine assembly comprising:
a combustor;
a fuel cell stack integrated with the combustor, the fuel cell stack configured (i) to direct fuel and air exhaust from the fuel cell stack in a radial direction into the combustor and (ii) to generate electrical energy;
a catalytic partial oxidation convertor that is fluidly connected to the fuel cell stack, the catalytic partial oxidation convertor being configured to optimize a hydrogen content of a first fuel stream of a fuel to be directed in the radial direction to the fuel cell stack;
a fuel source that provides the fuel and is fluidly connected to the catalytic partial oxidation convertor and the combustor, wherein the first fuel stream is directed from the fuel source to the catalytic partial oxidation convertor to optimize the hydrogen content of the first fuel stream directed into the fuel cell stack, and a second fuel stream of the fuel is directed from the fuel source to the combustor such that the combustor produces one or more gaseous combustion products within the combustor;
a compressor that is fluidly connected upstream of the combustor and the catalytic partial oxidation convertor, the compressor being configured to direct a first portion of air in a first flow path extending from the compressor and bypassing the combustor to extend into the catalytic partial oxidation convertor to optimize the hydrogen content of the first fuel stream, a second portion of air in a second flow path extending from the compressor to the combustor to mix and combust with the second fuel stream to produce the one or more gaseous combustion products, and a third portion of air in a third flow path extending from the compressor and bypassing the combustor to extend into the fuel cell stack such that the fuel cell stack produces the fuel and air exhaust, wherein the first flow path is radially spaced from the third flow path; and one or more subsystems electrically connected with the fuel cell stack, the one or more subsystems being configured to receive the electrical energy generated by the fuel cell stack, wherein the combustor is configured to combust the fuel and air exhaust from the fuel cell stack into the one or more gaseous combustion products that drive a downstream turbine.

2. The engine assembly of claim 1, wherein the fuel source comprises at least one of kerosene fuels and synthetic analogues, bio-jet fuels, synthetic gasoline, biodiesel, methanol, dimethyl ether (DME), ethanol, glycerol, formic acid, ammonia, hydrazine hydrate, liquid hydrogen, compressed hydrogen, and combinations thereof.

3. The engine assembly of claim 1, wherein the fuel source includes a secondary fuel source that provides the fuel and is fluidly connected to the combustor, the second fuel stream being directed from the secondary fuel source to the combustor.

4. The engine assembly of claim 1, further comprising a pre-burner system fluidly connected to the fuel cell stack, the pre-burner system being configured to control a temperature of the third portion of air directed into the fuel cell stack to 700° C.±200° C.

5. The engine assembly of claim 4, wherein the catalytic partial oxidation convertor, the pre-burner system, and the fuel cell stack are coupled within the engine assembly.

6. The engine assembly of claim 4, wherein the fuel source is fluidly connected to the pre-burner system and the catalytic partial oxidation convertor, wherein (i) a first portion of the first fuel stream is directed from the fuel source to the pre-burner system to raise a temperature of the third portion of air directed into the pre-burner system from the compressor and (ii) a second portion of the first fuel stream is directed from the fuel source to the catalytic partial oxidation convertor for optimizing the hydrogen content of the first fuel stream to be directed into the fuel cell stack.

7. The engine assembly of claim 1, wherein the combustor comprises one or more fuel injectors being configured to direct the second fuel stream and the second portion of air into the combustor, and the combustor being configured to combust the fuel and air exhaust directed into the combustor from the fuel cell stack into the one or more gaseous combustion products.

8. The engine assembly of claim 1, further comprising a heat exchanger that is fluidly connected to the catalytic partial oxidation convertor and the fuel cell stack.

9. The engine assembly of claim 1, wherein the fuel cell stack is circumferentially surrounding the combustor.

10. The engine assembly of claim 1, wherein the fuel cell stack is integrated within at least one of an inner liner and an outer liner of the combustor.

11. The engine assembly of claim 1, wherein the fuel cell stack is a solid oxide fuel cell stack.

12. The engine assembly of claim 1, wherein the second flow path is radially spaced from the first flow path and the third flow path.

13. An engine assembly comprising:
a combustor;
a fuel cell stack integrated with the combustor, the fuel cell stack configured (i) to direct fuel and air exhaust from the fuel cell stack in a radial direction into the combustor and (ii) to generate electrical energy;
a catalytic partial oxidation convertor that is fluidly connected to the fuel cell stack, the catalytic partial oxidation convertor being configured to optimize a hydrogen content of a first fuel stream of a fuel to be directed in the radial direction to the fuel cell stack;
a fuel source that provides the fuel and is fluidly connected to the catalytic partial oxidation convertor and the combustor, wherein the first fuel stream is directed from the fuel source to the catalytic partial oxidation convertor to optimize the hydrogen content of the first fuel stream directed into the fuel cell stack, and a second fuel stream of the fuel is directed from the fuel source to the combustor such that the combustor produces one or more gaseous combustion products within the combustor;
a compressor that is fluidly connected upstream of the combustor and the catalytic partial oxidation convertor, the compressor being configured to direct a first portion of air in a first flow path extending from the compressor and bypassing the combustor to extend into the catalytic partial oxidation convertor to optimize the hydrogen content of the first fuel stream, a second portion of air in a second flow path extending from the compressor to the combustor to mix and combust with the second fuel stream to produce the one or more gaseous combustion products, and a third portion of air in a third flow path extending from the compressor and bypassing the combustor to extend into the fuel cell stack such that the fuel cell stack produces the fuel and air exhaust, wherein the first flow path is radially spaced from the third flow path;
an AC/DC convertor configured to convert DC current of the electrical energy generated by the fuel cell stack into AC current; and
one or more subsystems electrically connected with the fuel cell stack, the one or more subsystems being configured to receive the AC current,
wherein the combustor is configured to combust the fuel and air exhaust from the fuel cell stack into the one or more gaseous combustion products that drive a downstream turbine.

14. The engine assembly of claim 13, wherein the fuel source comprises at least one of kerosene fuels and synthetic analogues, bio-jet fuels, synthetic gasoline, biodiesel, methanol, dimethyl ether (DME), ethanol, glycerol, formic acid, ammonia, hydrazine hydrate, liquid hydrogen, compressed hydrogen, and combinations thereof.

15. The engine assembly of claim 13, further comprising a pre-burner system fluidly connected to the fuel cell stack, the pre-burner system being configured to control a temperature of the third portion of air directed into the fuel cell stack to 700° C.±200° C.

16. The engine assembly of claim 15, wherein the catalytic partial oxidation convertor, the pre-burner system, and the fuel cell stack are coupled within the engine assembly.

17. The engine assembly of claim 15, wherein the fuel source is fluidly connected to the pre-burner system and the catalytic partial oxidation convertor, wherein (i) a first portion of the first fuel stream is directed from the fuel source to the pre-burner system to raise a temperature of the third portion of air directed into the pre-burner system from the compressor and (ii) a second portion of the first fuel stream is directed from the fuel source to the catalytic partial oxidation convertor for optimizing the hydrogen content of the first fuel stream to be directed into the fuel cell stack.

18. The engine assembly of claim 13, wherein the combustor comprises one or more fuel injectors being configured to direct the second fuel stream and the second portion of air into the combustor, and the combustor being configured to combust the fuel and air exhaust directed into the combustor from the fuel cell stack into the one or more gaseous combustion products.

19. The engine assembly of claim 13, further comprising the downstream turbine connected to the combustor downstream of the combustor.

20. The engine assembly of claim 13, further comprising a heat exchanger that is fluidly connected to the catalytic partial oxidation convertor and the fuel cell stack.

* * * * *